UNITED STATES PATENT OFFICE.

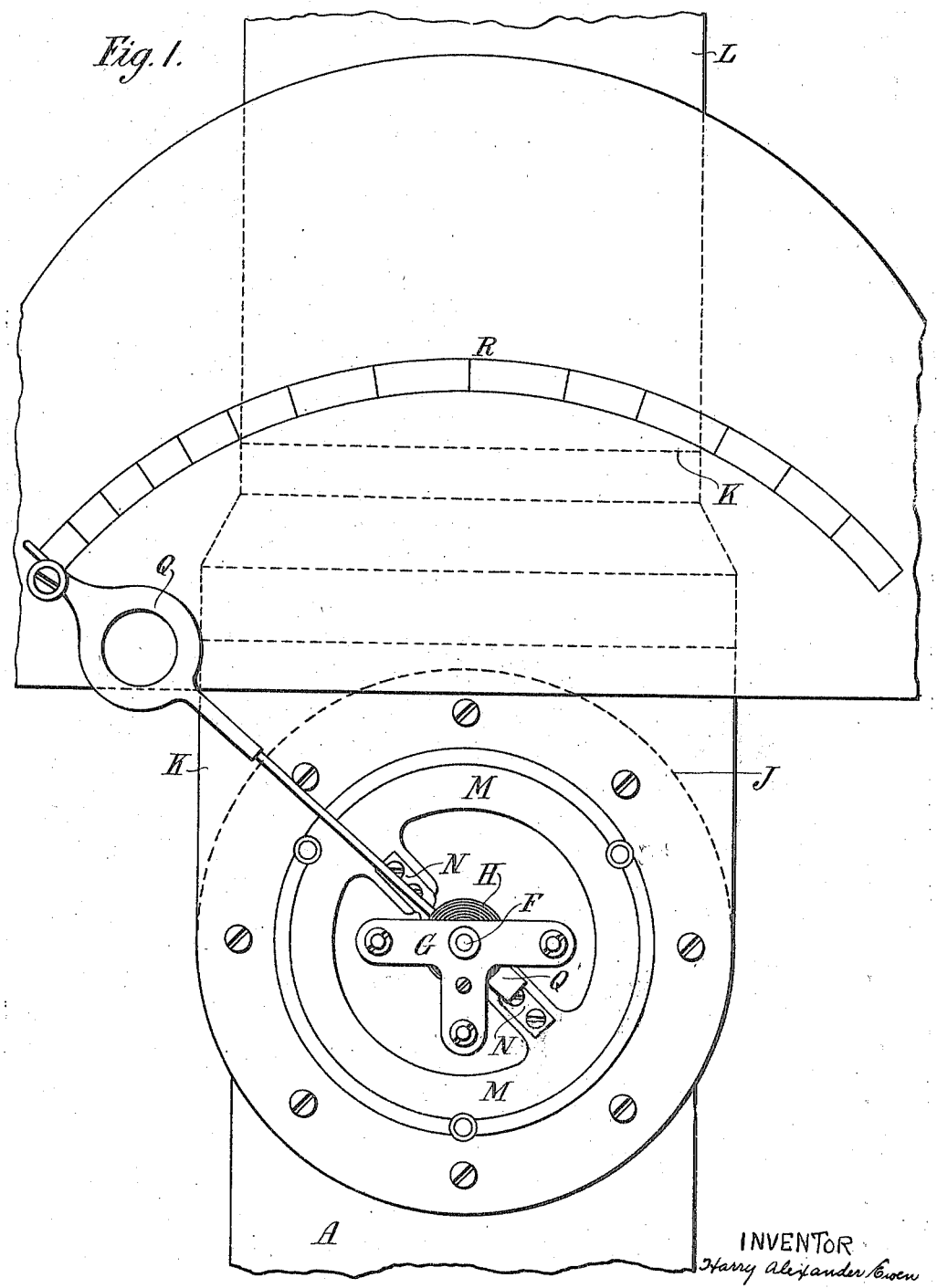

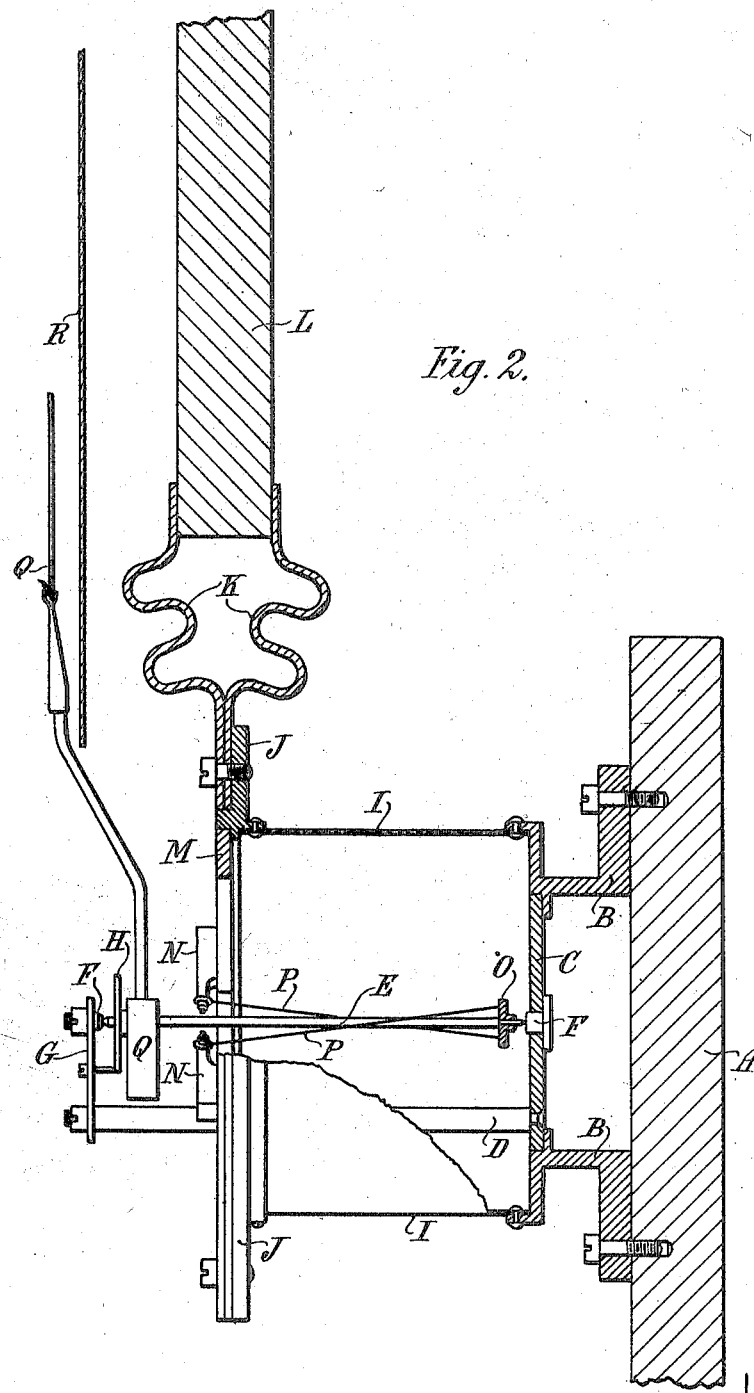

HARRY ALEXANDER EWEN, OF LONDON, ENGLAND, ASSIGNOR TO MARCONI WIRELESS TELEGRAPH COMPANY OF AMERICA, OF NEW YORK, N. Y., A CORPORATION OF NEW JERSEY.

MEASURING INSTRUMENT.

1,273,167.     Specification of Letters Patent.     Patented July 23, 1918.

Application filed June 28, 1917. Serial No. 177,516.

*To all whom it may concern:*

Be it known that I, HARRY ALEXANDER EWEN, a subject of the King of Great Britain, residing at Marconi House, Strand, London, England, have invented a new and useful Improvement in Measuring Instruments, of which the following is a specification.

This invention relates to measuring instruments of the type which depend for their action upon the expansion of a body under the influence of heat.

My invention is illustrated by the accompanying drawing, which shows by way of example an ammeter constructed in accordance with my invention, Figure 1 being a plan and Fig. 2 a sectional elevation.

A is a bus bar to which is secured a metal ring B supporting a plate C. Stepped in the plate is a column D of inexpansible material. E is a spindle rotatably mounted in bearings F, F, carried by the plate C, and an arm G on the column D respectively. H is a spring one end of which is connected to the spindle, while the other end is connected to the arm G. I is a cylinder formed of expansible metal and mounted on the ring B; this cylinder carries a metal ring J which is connected by strips of copper K to a bus bar L. Mounted in the ring J is a ring M of inexpansible material provided with two inwardly projecting lugs N, N; stretched between these lugs and a cross piece O secured to the bottom of the spindle E is a pair of filaments P.

When a current passes from one bar A to the other L through the cylinder I, the latter will expand owing to the heating effect of the current, and the distance between the lugs N and the cross piece O will therefore be increased, and the consequent pull of the wires P will cause the spindle E to rotate against the spring H through an angle which will depend upon the strength of the current and may be read by the movement of a pointer Q carried by the spindle over a scale R.

In order that the instrument may be unaffected by the temperature of the surrounding atmosphere, the cylinder I and wires P are made of the same metal, or at least of material having the same linear coefficient of expansion.

In order that the movement of the ring J may be as free as possible, the copper strips K are bent as shown.

What I claim is:—

1. In a measuring instrument, the combination with a support, of means fixed to said support forming a bearing, a spindle arranged to thrust against said bearing, means for normally urging said spindle in one direction about its axis, and means for overcoming the action of said first mentioned means, comprising a member constructed to expand parallel to the axis of said spindle upon the passage of current through the member and connections between said member and said spindle symmetrical with respect to the axis of said spindle, the position of said bearing being unaffected by the passage of the current.

2. In a device of the class described, in combination a fixed support, a bearing carried by said support, means providing a bearing at a fixed distance from said first-mentioned bearing, a spindle supported by said bearings and arranged to thrust against said second mentioned bearing, a member constructed to expand upon the passage of current therethrough and arranged parallel to the axis of said spindle, one end of said member being secured to said support and the other end thereof being free to move, a filament connection between said member and spindle for turning said spindle in one direction upon the expansion of said member, said connection being symmetrical with respect to the longitudinal axis of said spindle, and means for resisting the turning movement of said connection.

3. In a measuring instrument, the combination of a spindle capable of rotational movement but not of movement parallel to its axis, a cylinder surrounding said spindle and formed of conducting material and having one end fixed in relation to the spindle, an arm upon the spindle, a filament stretched between the arm and the free end of the cylinder, means for applying to the spindle a controlling force and means for indicating the movement of the spindle.

4. In an electrical measuring instrument, the combination of an inexpansible frame, a cylinder formed of expansible metal and having one end secured to the frame, a spindle journaled in the frame, a ring formed of inexpansible material and carried by the free end of the cylinder, a cross piece on the spindle, a pair of wires having the same linear co-efficient of expansion as the metal of which the cylinder is formed and stretched between the cross piece and the ring, a spring connecting the spindle to the frame and an indicating arm fast on the spindle.

In testimony that I claim the foregoing as my invention, I have signed my name this third day of April, 1917.

HARRY ALEXANDER EWEN.